United States Patent
Joseph (10) Patent No.: US 11,667,438 B2
(45) Date of Patent: *Jun. 6, 2023

(54) REPLACEMENT GRIPPING MEMBER

(71) Applicant: John Joseph, Sacramento, CA (US)

(72) Inventor: John Joseph, Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/681,840

(22) Filed: Feb. 28, 2022

(65) Prior Publication Data

US 2022/0297888 A1   Sep. 22, 2022

Related U.S. Application Data

(63) Continuation-in-part of application No. 16/220,546, filed on Dec. 14, 2018, now abandoned.

(51) Int. Cl.
*B65D 25/32* (2006.01)
(52) U.S. Cl.
CPC ........ *B65D 25/32* (2013.01); *B65D 2525/289* (2013.01)
(58) Field of Classification Search
CPC ................ B65D 25/32; B65D 25/2879; B65D 2525/289
USPC ........................................................ 220/755
See application file for complete search history.

(56) References Cited

U.S. PATENT DOCUMENTS

| | | | | |
|---|---|---|---|---|
| 2,319,147 A | * | 5/1943 | Mason | A47J 45/062 220/759 |
| 2,398,436 A | * | 4/1946 | Mason | A47J 45/062 74/543 |
| 2,488,309 A | * | 11/1949 | Mason | A47J 45/08 220/759 |
| 2,654,115 A | * | 10/1953 | Kafer | B65D 25/282 220/753 |
| 5,224,252 A | * | 7/1993 | Baker | B65H 54/46 492/38 |
| 7,039,996 B2 | * | 5/2006 | Crawley | A45C 13/26 220/759 |

* cited by examiner

*Primary Examiner* — Jeffrey R Allen
(74) *Attorney, Agent, or Firm* — Alfred F Hoyte, Jr.

(57) ABSTRACT

An improved gripping member for a weight bearing container. The gripping member is specifically designed to either replace an existing gripping member, or improve a two part handle for a weight bearing container by providing a larger diameter gripping surface. The improved gripping member is formed of two identical mating halves that can be releasably attached to form a cylindrical gripping surface with a relatively large diameter. When attached about an existing gripping member or wire handle portion of a two part handle the inventive gripping member provides a large diameter gripping surface to distribute the weight of the container about a larger portion of the user's palm.

3 Claims, 10 Drawing Sheets

REPLACEMENT GRIPPING MEMBER

CROSS REFERENCE TO RELATED APPLICATION

This application is a continuation in part of application Ser. No. 17/165,913, filed Feb. 2, 2021, which is a continuation in part of application Ser. No. 16/220,546, filed Dec. 14, 2018.

BACKGROUND OF THE INVENTION

The present invention relates generally to handles. More specifically, the invention relates to a replacement gripping member or handle which can be placed over an existing handle or grip.

STATEMENT OF THE PRIOR ART

Replacement handles for various items are well known in the art. The replacement handles are generally made of a molded plastic and serve to provide a larger or "grippier" surface area as compared to the original. The handles of the prior art typically replace, as opposed to cover, the original handles.

Replacement handles and/or gripping members for buckets or other large containers which can hold relatively heavy contents are of particular concern. The existing bucket or "heavy container" handles typically come in two parts. The first part comprises an elongate metal wire or arm. The metal arm is bent into a generally semi-circular shape. The ends of the arm are bent to engage portions of the top of the cylindrical container. The arm also includes a central section intermediate the ends of the arm. The second part of the handle is a cylindrical gripping member which rotatably fits on the central section of the arm and which is shaped to comfortably contour to the hand of a user. The cylindrical gripping member is typically made from plastic and is sized to prevent the wire from "digging" into the user's hand when the container is heavily laden. The plastic comprising the gripping member degrades and breaks, especially when subjected to sunlight. After the gripping member breaks, the bucket is often discarded because a new gripping member is not readily available.

Typical of these devices is that disclosed in U.S. Pat. No. 7,980,415 issued to one Crawley for a replacement gripping member for a bucket. The device consists of a single molded plastic piece formed of two nearly identical halves which interlock over a central portion of the wire handle of the bucket. While Crawley is effective, it can only be employed by either removing the existing gripping member or waiting for the gripping member to fail and then replacing it. The present invention can be used either as a replacement handle or to increase the diameter of the existing gripping member.

SUMMARY OF THE INVENTION

The present invention overcomes the disadvantages of the prior art by providing an improved gripping member for a weight bearing container. The gripping member is specifically designed to either replace an existing gripping member, provide a griping member where there is none, or improve a two part handle for a weight bearing container or item by providing a larger diameter gripping surface. The improved gripping member is formed of two mating halves that can be releasably attached to form a cylindrical gripping surface with a relatively large diameter. When together, the halves form a grip having an interior channel sized for positioning about weight bearing handles of various geometries and configurations. When attached about an existing gripping member or wire handle portion of a two part handle the inventive gripping member provides a large diameter gripping surface to distribute the weight of the container about a larger portion of the user's palm.

Accordingly, it is an object of the invention to provide an improved gripping member for a weight bearing container which has a larger diameter gripping surface than a conventional gripping member or wire handle.

It is another object of the invention to provide an improved gripping member which can replace or improve an existing gripping member.

It is another object of the invention to provide an improved gripping member which can be positioned about an existing gripping member or a wire handle.

It is another object of the invention to provide an improved gripping member which can be positioned about a weight bearing handle of virtually any configuration.

It is another object of the invention to provide an improved gripping member which has opposing abutment surfaces to limit horizontal displacement of a user's hand.

It is another object of the invention to provide an improved gripping member having a male and a female half adapted for locking engagement.

It is another object of the invention to provide an improved gripping member having a male and a female half with locking tabs and corresponding recesses configured to reduce accidental lateral displacement.

It is another object of the invention to provide an improved gripping member having reinforced locking tabs to increase the load bearing capacity of the member.

It is another object of the invention to provide an improved gripping member having a cylindrical channel or bore of sufficient diameter to enclose an existing gripping member.

DETAILED DESCRIPTION OF THE INVENTION

Referring now to FIGS. 1-9 the inventive device, generally indicated by the numeral 10 is shown. The invention, which is essentially an enhanced gripping member 10, is designed as an "oversized" grip to spread the weight of an attached container, vessel, etc. more broadly and evenly within a user's hand. The gripping member 10 of the invention is designed primarily for use with buckets or other containers where relatively heavy loads may be placed. However, the gripping member 10 may be used as a portable handle for any number of items as will be discussed below. Buckets are of particular concern because they tend to carry liquids, and liquids are dense and therefore very heavy per volume. The prior art addresses this weight issue by providing a two part, removable handle.

The first part of a typical prior art handle comprises an elongate metal wire or arm having a diameter of about one-eighth of an inch. The metal arm is bent into a generally semi-circular shape. The ends of the arm are bent to engage portions of the top of the cylindrical container. The arm also includes a central section intermediate the ends of the arm. The second part of the handle is a cylindrical gripping member which rotatably fits on the central section of the arm and which is sized to comfortably fit the hand of a typical user. The cylindrical gripping member is typically made from plastic and includes a honeycomb interior. The gripping members of prior art handles are typically about ½ inches in diameter, this being a standard size which is used with the vast majority of prior art 1 to 5 gallon buckets. The problem with this arrangement is that the plastic comprising the gripping member, typically some type of polymer, degrades and breaks, especially when subjected to sunlight or repeated stress. After the gripping member breaks, the bucket is often discarded because a new gripping member is not readily available and the bare metal arm will tend to "dig" into the hand of the user, an effect greatly exacerbated when the container is heavily laden. The prior art addresses the problem by providing replacement handles or replacements for the gripping member. The gripping member replacements can only be employed by removing the existing handle which, given the thickness and hardness of the plastic typically used in these applications, can be quite difficult. Also, the replacements are invariably roughly the same diameter as the original and like the original, are inadequate to provide sufficient weight distribution when held in the hand of an average adult.

Figure 1:
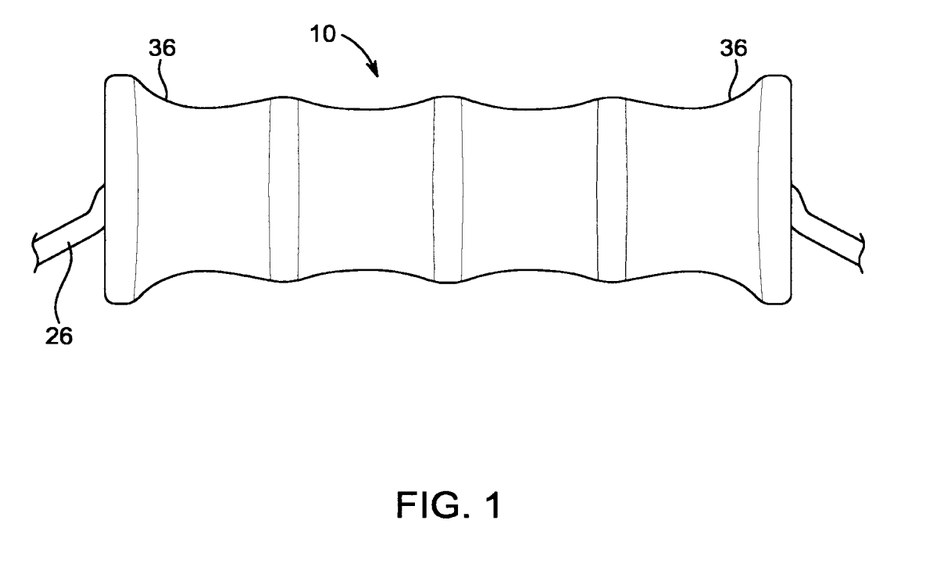
FIG. 1 is a front elevational view of the gripping member of the invention applied to a wire handle.
Figure 2:
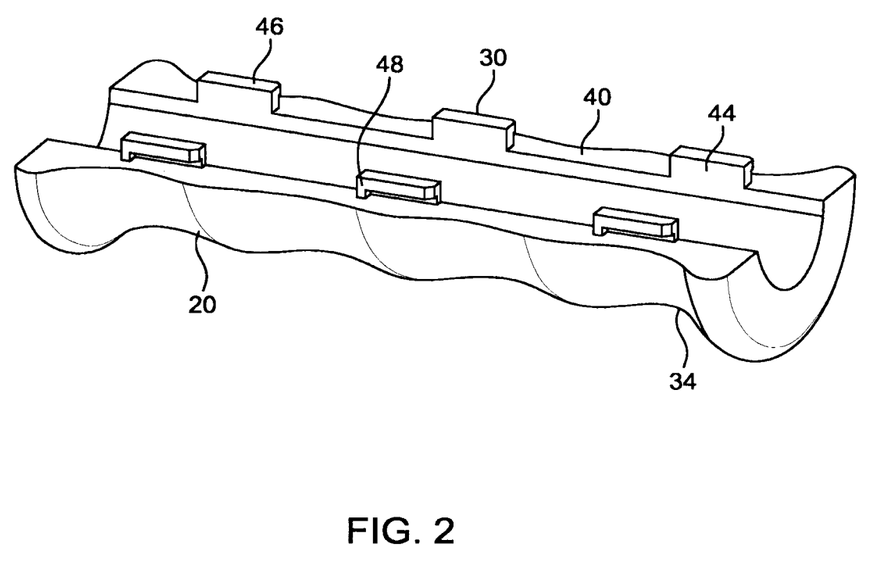
FIG. 2 is a perspective view of a male half of the inventive gripping member.
Figure 3:
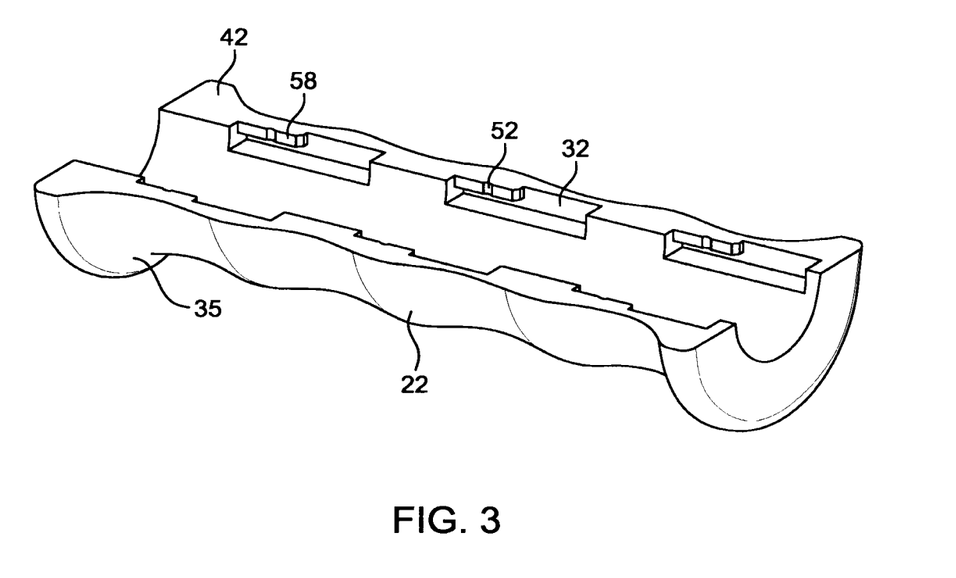
FIG. 3 is a perspective view of a female half of the gripping member.

The present invention 10 can be used as either a replacement gripping member or an enhanced (essentially a larger diameter) gripping member. To that end, the device 10 is formed of two halves 20, 22 which, when mated, form a relatively large gripping member having an "oversized" cylindrical opening or channel 24. Channel 24 has a sufficient interior diameter to allow a "standard" wire arm 26 or a typical grip 28 to pass therethrough. Thus, the channel 24 is preferably at least about ¾ inches in diameter. The relatively large inner diameter of channel 24 does not adversely affect performance of the device 10 when either the wire arm 26 or grip 28 is positioned therein and it should be noted that the channel 24 is sized to include some "play" or extra space between the inner diameter of the grip 28 and the arm 26. The channel 24 can accommodate a wire arm 26 or grip 28 of about ¾ inches in diameter so that the device 10 can be used with virtually any container handle as almost none have a diameter (either wire arm 26 or grip 28) greater than ¾ inches. Also, the device 10 can be used to "enhance" an existing grip 28 even if that grip 26 is cracked or otherwise damaged. This is because when the device 10 is enclosed about an existing grip 28, any damaged portion of the grip 28 which cannot be easily removed will be contained within channel 24. It is known that a cracked grip can cause injuries to a user's hand. The diameter of the channel 24 also allows for significant curvature of the wire arm 26, which can be an issue for small buckets as these vessels tend to have an arm 26 or handle which is necessarily more curved as the span of the arm 26 is short. Finally, when the device is positioned about an existing grip 28, channel 24 is sized to receive the grip 28 in snug frictional engagement so that relative lateral displacement is not possible.

A key aspect of the invention 10 is that it is removable i.e., detachable, so that it can be used on more than one container, either as a replacement grip or to enhance an existing grip. Accordingly, male and female halves 20, 22 are designed to be releasably attached. This arrangement therefore creates a possibility of unintended separation which, in the event a heavy load is being carried, could be dangerous to the user. Accordingly, the device 10 must be designed to minimize both unintended lateral and vertical displacement of the two halves. To that end, a series of locking tabs and corresponding recesses are provided on the male and female halves 20, 22, respectively. The tabs and recesses are configured to perform three functions, namely, the joining of male and female halves 20, 22, the prevention of relative lateral movement between the halves 20, 22, and the prevention of vertical separation between the halves 20, 22.

Male 20 and female 22 halves are joined by way of a series of linearly spaced, laterally paired, male tabs 30 and corresponding recesses 32. Male half 20, like female half 22 is substantially semi-cylindrical though it could be rectangular or any other elongated shape. The semi-circular end portions 34, 35 of male 20 and female 22 halves expand diametrically outwardly so that the exterior surface of end portions 34, 35 form arcuate abutment surfaces 36 to restrict lateral movement of the user's hand when the halves 20, 22 are joined. Flat co-planar attachment surfaces 40, 42 extend between end portions 34, 35.

Figure 4:
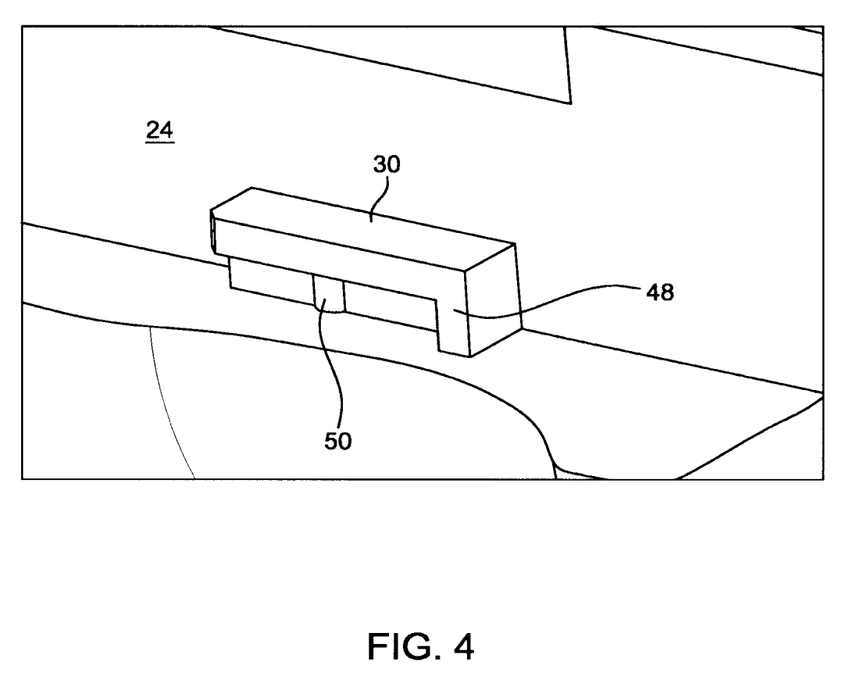
FIG. 4 is a detail of a locking tab of the male half of the gripping member.
Figure 5:
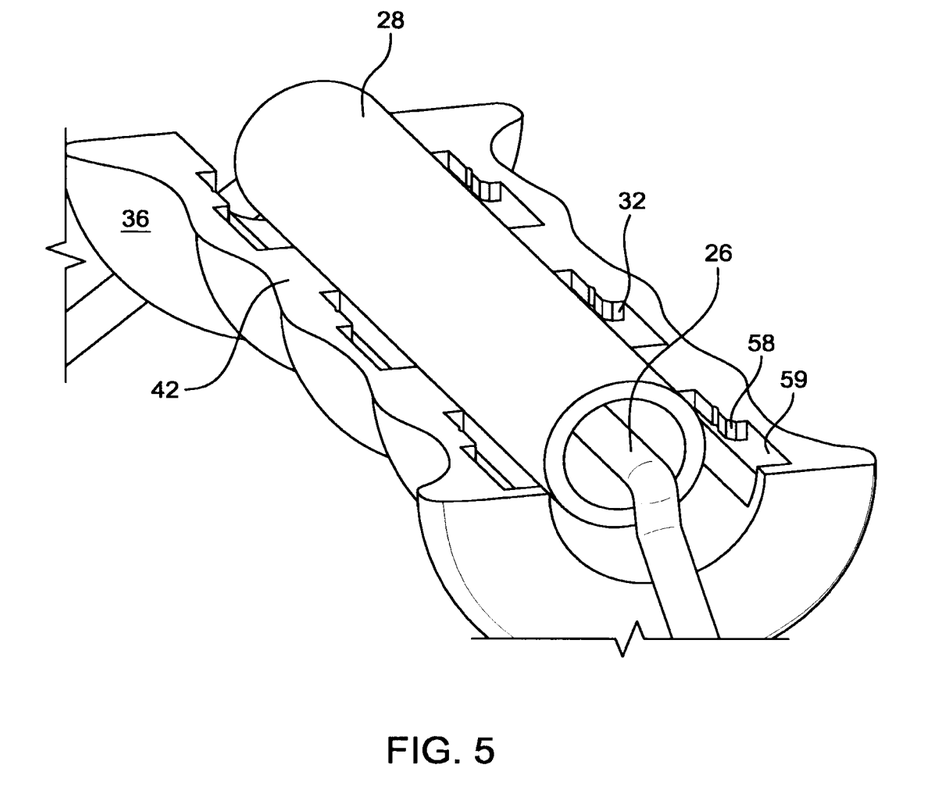
FIG. 5 is a perspective view of the female half of the gripping member with a standard wire handle and grip inserted therethrough.

Referring now particularly to FIGS. 2 and 4, the male half 20 is shown. It can be seen that the locking tabs 30 extend in pairs from opposing surfaces 40. The locking tabs 30 perform the dual functions of securing the halves 20, 22 and preventing sliding disengagement of the halves 20, 22 when the device 10 is in use. As shown, there are preferably six locking tabs 30 but there may be more or fewer provided they are reinforced to prevent unintended separation of the male 20 half from the female half as will be explained in more detail later. Six locking tabs 30 are optimal as it distributes the resistance to sliding disengagement evenly along the length of the device 10, while simultaneously reducing the amount of force required to intentionally disengage. A single locking tab 30 or tab pair would have to be very robust and would require a lot of force to engage and disengage. Regardless of the number of tabs 30, they must be symmetrically positioned on surfaces 40 so that paired tabs 30 depend from the same relative lateral position on opposing surfaces 40. Each tab 30 includes an upstanding vertical (when oriented as shown) wall 44 with a co-extensive flange 46 which extends horizontally perpendicular to the wall 44. The flange 46 is positioned along the top of the wall 44 with a rearmost vertical stop portion 48 of the flange 46 extending from the top to the bottom of the wall 44 and serving as both a stop for the horizontally slidably inserted tab 30 and a reinforcement that allows only one way slidable disengagement of the device 10. A semi-cylindrical protrusion 50 positioned approximately centrally lengthwise on said wall 44 is sized and positioned to engage a correspondingly shaped indentation 52 formed in tab receiving recess 32 formed in the female half 22 of the device 10. When the protrusion 50 is frictionally engaged within indentation 52 the male 20 and female 22 halves are "locked" so that the possibility of unintended relative lateral displacement is greatly reduced. Normal use of the device 10 even with a weight bearing vessel cannot generate enough force to disengage the male 20 half from the female 22 half.

Female half 22 is substantially identical to male half 20 with the exception of tab receiving recesses 32. The recesses 32 are essentially elongated slots formed in attachment wall 60, which wall terminates at and is generally perpendicular to attachment surface 42. The recesses 32 are configured and sized for both frictional and locking engagement with tabs 30. When engaged, the configuration of tabs 30 and recesses 32 serve to prevent both unintentional sliding disengagement and vertical separation of the halves 20, 22. Each recess 32 has a flange (46) engaging slot 58 adjacent to a tab receiving opening 59, the opening 59 having a laterally recessed rear wall 61, the recessed wall 61 creating space for the insertion of tab 30. Locking lip 63 extends horizontally from the rear wall 61, the wall 61 and lip 63 defining the boundaries of the tab 30 retaining portion 67 of the recess 32. The lip 63 includes arcuate indentation 52 sized to receive protrusion 50 by "snap-fit".

Figure 6:
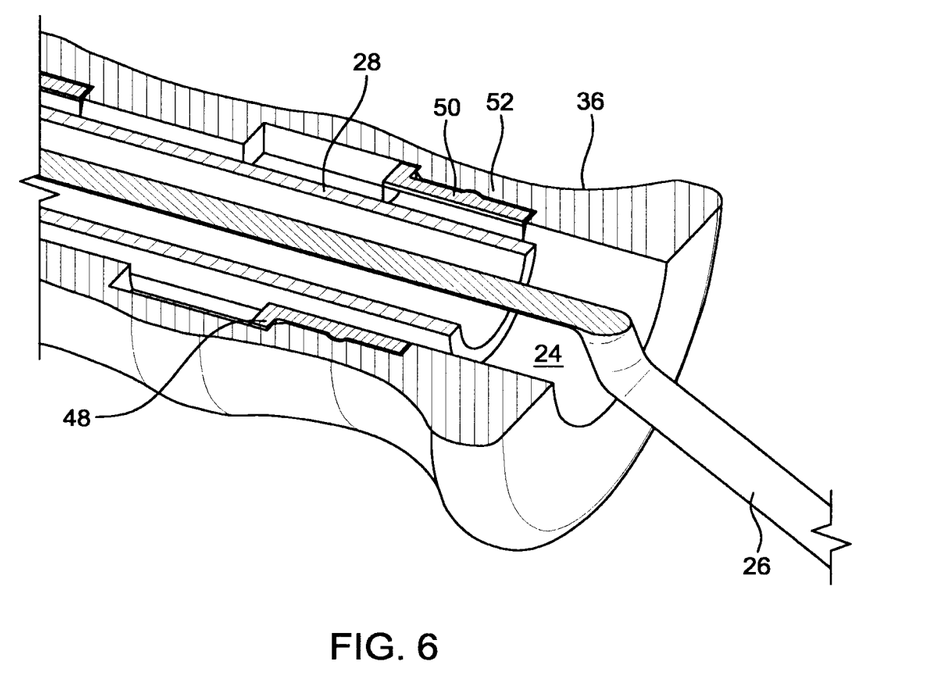
FIG. 6 is a sectional view of the gripping members illustrating the interaction of the male half locking tabs with the recesses of the female half while engaged.
Figure 7:
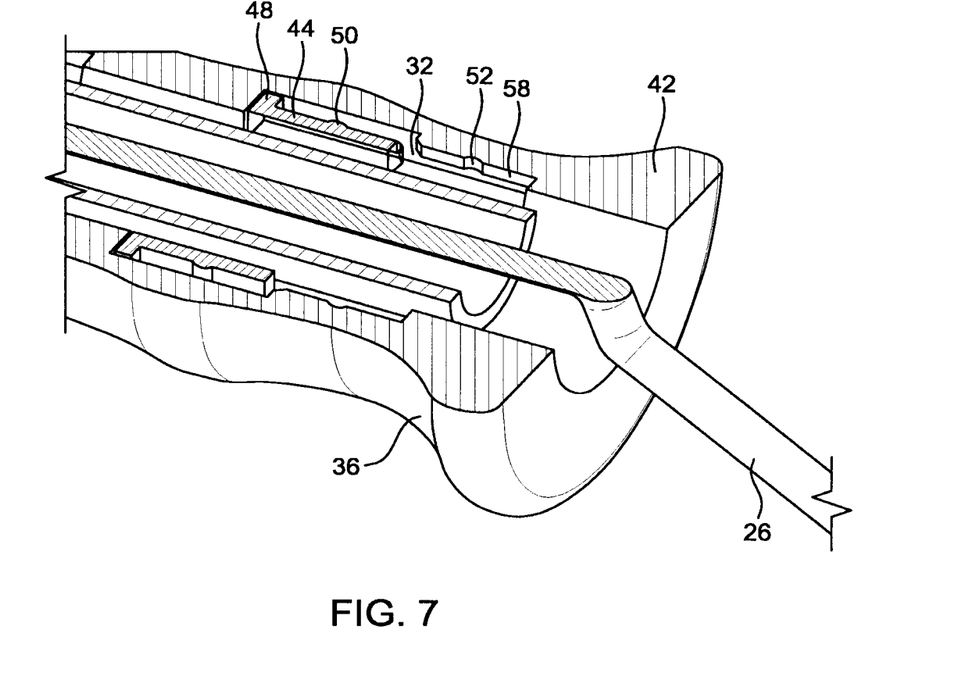
FIG. 7 is a sectional view of the gripping members illustrating the interaction of the male half locking tabs with the recesses of the female half when disengaged.

Unintended sliding separation of the male 20 half from the female 22 half can be a concern when carrying heavy loads. Accordingly, the device 10 is reinforced to greatly reduce that possibility. To that end protrusions 50 are made robust, that is, relatively large. While this oversized arrangement makes even intended separation somewhat difficult, the device 10 can still be used (i.e., intentionally separated) by an adult of "average" strength. While protrusion 50 and indentation 52 serve to lock halves together while limiting unintended (sliding or horizontal) disengagement from sliding displacement in either direction, the rearmost portion 48 of the flange 46 serves as an abutment stop for locking tab 30, the tab abutting portion 48 pressed against the edge 65 of locking lip 63 when the tab 30 is fully inserted and "locked". Protrusion 50 and indentation 52 serve to limit relative horizontal movement or sliding of male 20 and female 22 halves of the device 10 as stated above, while rearmost abutment portion 48 of the flange 46 provides additional mass to the tab 30 thereby providing greater resistance to vertical shear.

Unintended vertical separation is prevented by the interaction of the locking lip 63 of recess 59 and flange 46. As can be seen most clearly in FIG. 7, when tab 30 is fully inserted into the tab 30 retaining portion 67 of the recess 32, flange 46 is under lip 63 so that relative vertical movement of halves 20, 22 is impossible without deformation of both locking lip 63 and flange 46, this deformation is virtually impossible with the forces generated from carrying a load with a human hand due to the strength and rigidity of the plastic material used.

In operation, the user can remove any damaged original grip or portion thereof from an existing wire (or plastic or other material) handle, if necessary. The gripping member 10 of the invention is positioned approximately centrally along the wire handle of the container with the halves 20, 22 separated. If the original grip is still in place, the gripping member 10 is positioned to cover or overlap the original grip, effectively increasing the diameter of the original grip as stated above. The halves 20, 22 are then aligned so that attachment surfaces 40, 42 are approximately parallel, so that tabs 30 may be vertically pushed down into tab receiving openings 59 and then horizontally slid into snap engagement within tab engaging slot 58 as described above, whereupon attachment surfaces 40, 42 are flush with no gap or space in between. The device 10 may be removed by sliding the male 20 and female 22 halves in opposite directions, so that the device 10 may be used with another container if desired.

Figure 8:
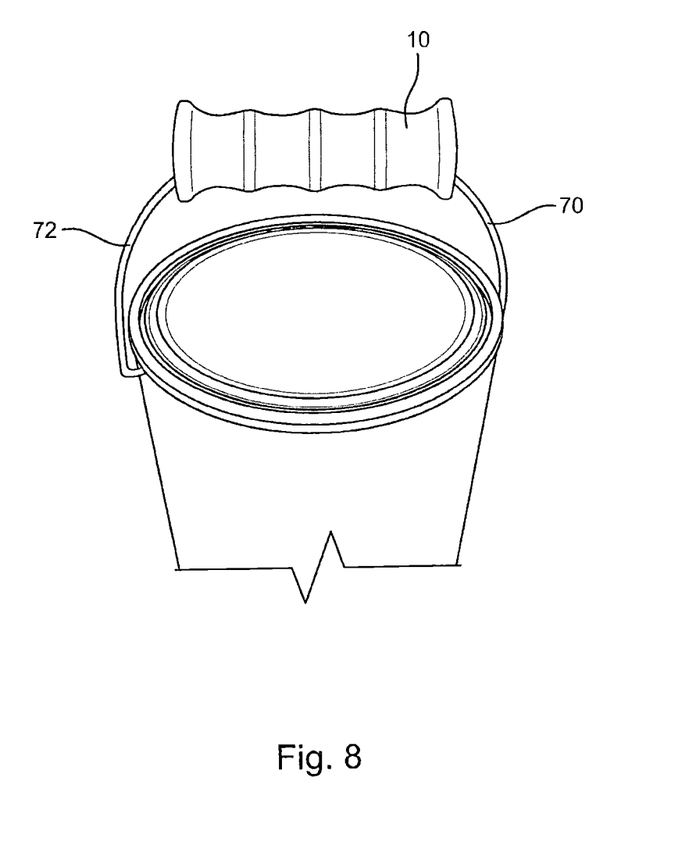
FIG. 8 is a top view of the gripping member used with a paint can.
Figure 9:
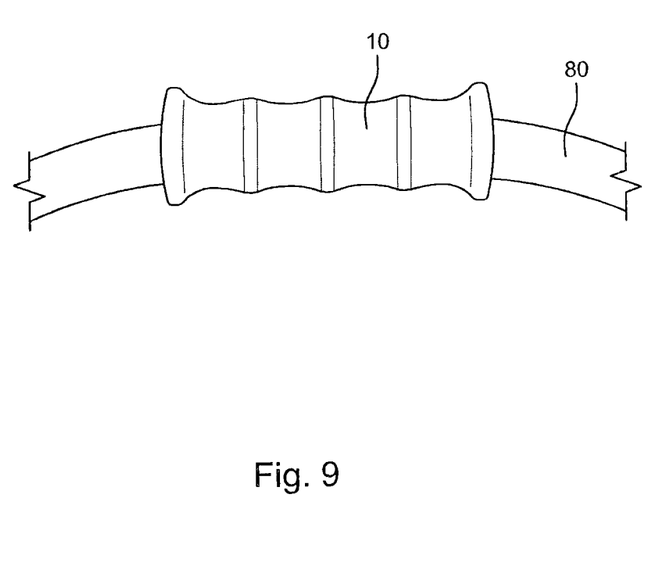
FIG. 9 is a perspective view of the gripping member used with a strap secured to an item.

The device 10 may also be used as a grip for various items. The items can be virtually any article having either a handle or an elongated carrying strap such as that used with a luggage such as a duffle bag. FIG. 8 shows a can of paint 70 having a wire bail 72. A user may position the grip 10 about the bail 72 in the manner described above to allow a user to carry the can 70. The bail 72 would rest on the lower half of the channel 24 when the can is lifted by way of the grip. FIG. 9 shows the grip 10 used with a rope, strap, or other elongated flexible article 80 which can be used in a weight bearing capacity. The strap 80 may be attached to, e.g., a luggage item such as a duffle bag. The portable grip 10 may be handily carried about for use with any existing handle, wire bail, strap, or other type of elongated weight bearing member provided the member can fit within channel 24.

Figure 10:
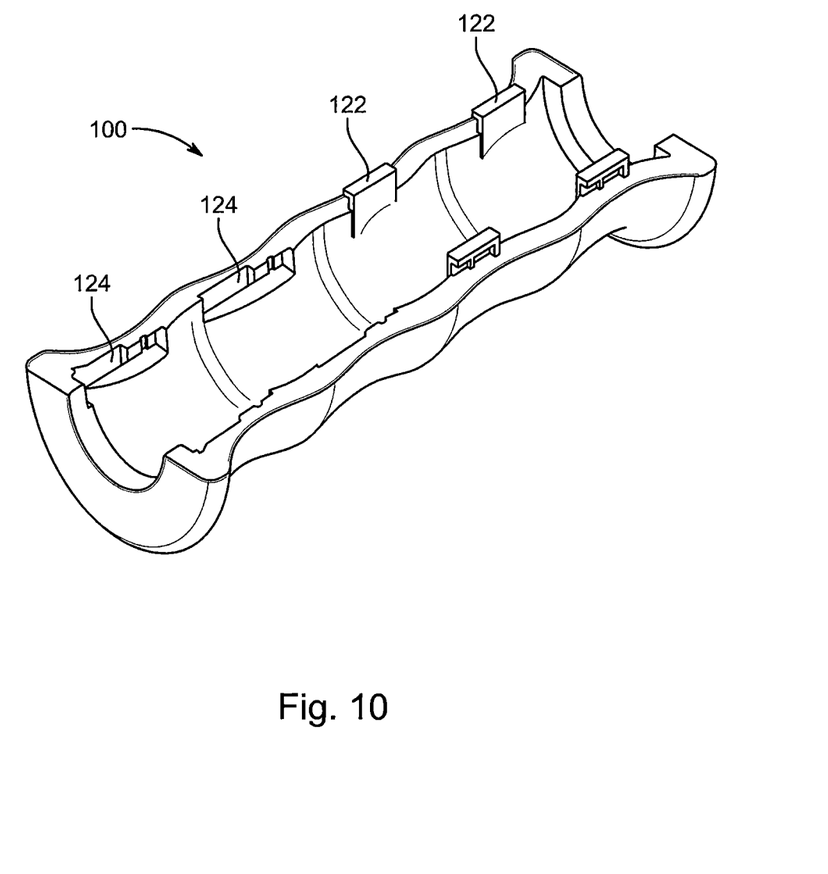
FIG. 10 is a perspective view of an alternative embodiment of the gripping member.

Referring now to FIG. 10, an alternative embodiment of the invention, generally indicated by the numeral 100 is shown. In this configuration, both halves of the device 100 have both tabs and recesses and are identical. Accordingly, only a single detached half 120 is shown, it being understood that it would be joined with another identical half 120 in exactly the same manner as described above, the joined identical halves 120 forming a handle 130. The identical half configuration allows a single mold to be used during the manufacturing process, resulting in a substantial savings in manufacturing costs. Also, a user with more than one device 100 can mix and match halves, which may be different colors. The colored devices may be used to indicate the contents of the vessel or item they are attached to, e.g., blue can indicate water and red can indicate toxic material. Thus, for example, one can avoid filling a bucket to water plants if a red device is used for the handle (indicating toxic material is or was in the bucket), as trace toxic material is likely to remain in the vessel for some time after use.

It can be seen that the tabs 122 and recesses 124 are identical to tabs 30 and recesses 32 so that the engagement and disengagement process is as described above. Specifically, when the protrusions are frictionally engaged within indentations the halves 120 are "locked" so that the possibility of unintended relative lateral displacement is greatly reduced. Also, unintended vertical separation is prevented by the interaction of the locking lips, recesses, and flanges.

In operation, the two identical halves 120 can be engaged and disengaged to selectively form a handle about a wire bail, a strap, or other weight bearing member.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

The invention claimed is:
1. A replaceable gripping member for a weight bearing container having a wire handle comprising:
    identical mating halves, each of said mating halves having attachment surfaces, said attachment surfaces having both tabs and tab receiving recesses, said tabs and recesses allowing for selectively joining said identical halves;

each of said tabs including an upstanding vertical wall with a co-extensive flange which extends horizontally perpendicular to the wall, wherein the flange is positioned along a top of the wall with a rearmost vertical stop portion of the flange extending from the top to a bottom of the wall and serving as both a stop for the horizontally slidably inserted tab and a reinforcement that allows only one way slidable disengagement of the device, and a semi-cylindrical protrusion positioned on said wall;

each of said recesses having a flange engaging slot adjacent to a tab receiving opening, the opening having a laterally recessed rear wall, the recessed wall creating space for the insertion of one of said tabs, a locking lip extending horizontally from the rear wall and including an arcuate indentation sized to receive the semi-cylindrical protrusion of a corresponding tab by snap-fit when the halves are slid axially with respect to each other;

said tabs and recesses allowing for sliding snap-fit engagement and disengagement of said halves;

whereby both unintended lateral and vertical separation of said halves is limited by interaction of said tabs within said recesses.

2. The gripping member of claim 1 having an internal channel when said halves are joined.

3. The gripping member of claim 2 wherein said internal channel has at least a ¾ inch diameter.

* * * * *